March 14, 1972 G. W. HOFFMAN 3,649,556

PRODUCTION OF POLYSILICIC ACID BY ION EXCHANGE

Filed July 22, 1970

INVENTOR
GEORGE W. HOFFMAN

BY Delmar H. Jan

AGENT

United States Patent Office

3,649,556
Patented Mar. 14, 1972

3,649,556
PRODUCTION OF POLYSILICIC ACID BY ION EXCHANGE
George W. Hoffman, Houston, Tex., assignor to NL Industries, Inc., New York, N.Y.
Continuation-in-part of application Ser. No. 669,171, Sept. 20, 1967. This application July 22, 1970, Ser. No. 57,684
Int. Cl. B01j 13/00; C01b 33/14
U.S. Cl. 252—313 S                                6 Claims

ABSTRACT OF THE DISCLOSURE

The invention provides a process of converting an alkali metal silicate, such as sodium silicate, to polysilicic acid by the use of a cation exchange resin bed. Degradation of the resin and clogging of the bed by silica gel are avoided by the combined use of a macroreticular resin; the use of a follower rinse of dilute sodium hydroxide; and subsequent water rinses in both forward and reverse directions; followed by acid regeneration; followed by water rinses in the forward and reverse directions. This combination of features enables the use of relatively concentrated silicate solutions, and recycling for thousands of cycles using the same resin bed. A preferred resin is a macroreticular sulfonated co-polymer of styrene and di-vinylbenzene; a preferred alkali metal silicate is sodium silicate having a $SiO_2:Na_2O$ ratio of 3.75:1; and, preferred regenerating acids are sulfuric and hydrochloric.

---

This application is a continuation-in-part of my co-pending application, Ser. No. 669,171, filed Sept. 20, 1967 and now abandoned.

This invention relates to an improved method for producing polysilicic acid using a cation exchange resin.

It is known to pass an aqueous solution of an alkali metal silicate, such as sodium silicate, through a resinous cation exchange bed so as to replace the sodium ions by hydrogen ions, thus resulting in a solution of polysilicic acid. The process is generally complicated, however, by various difficulties, among which are the clogging of the cation exchange resin bed with gelatinous material having the nature of silica gel or a mixed sodium silicate silica gel; the irreversible loss in exchange capacity of the bed; and the inability to carry out the process while avoiding the aforesaid difficulties without the use of silicate solutions which are so dilute as to make the procedure uneconomic.

Descriptions of the process broadly described above, together with much of the difficulties and listings of the commercial uses of the polysilicic acids so produced, may be found in the patent to Bird, No. 2,244,325, and in French Patent No. 1,386,608. Likewise, descriptions are contained in J. Alexander's Colloid Chemistry 6 1114, 1115, New York (1946), and in the book, The Colloid Chemistry of Silica and Silicates, Iler, Ithaca (1955). Cation exchange resins are described in the book by Kunin entitled Ion Exchange Resins 2, New York (1958). All of the above are hereby incorporated herein by reference.

An object of the present invention is to provide a process which enables the conversion of an alkali metal silicate to polysilicic acid at a relatively high concentration of silica and under a combination of conditions which enables a substantially and indefinitely large number of cycles to be carried out with the same cation exchange resin bed, and with a resulting product very low in alkali metal content.

Other objects of the invention will appear as the description thereof proceeds.

In the drawings, FIG. 1 is a schematic flow diagram illustrating my inventive process.

Figure 1:
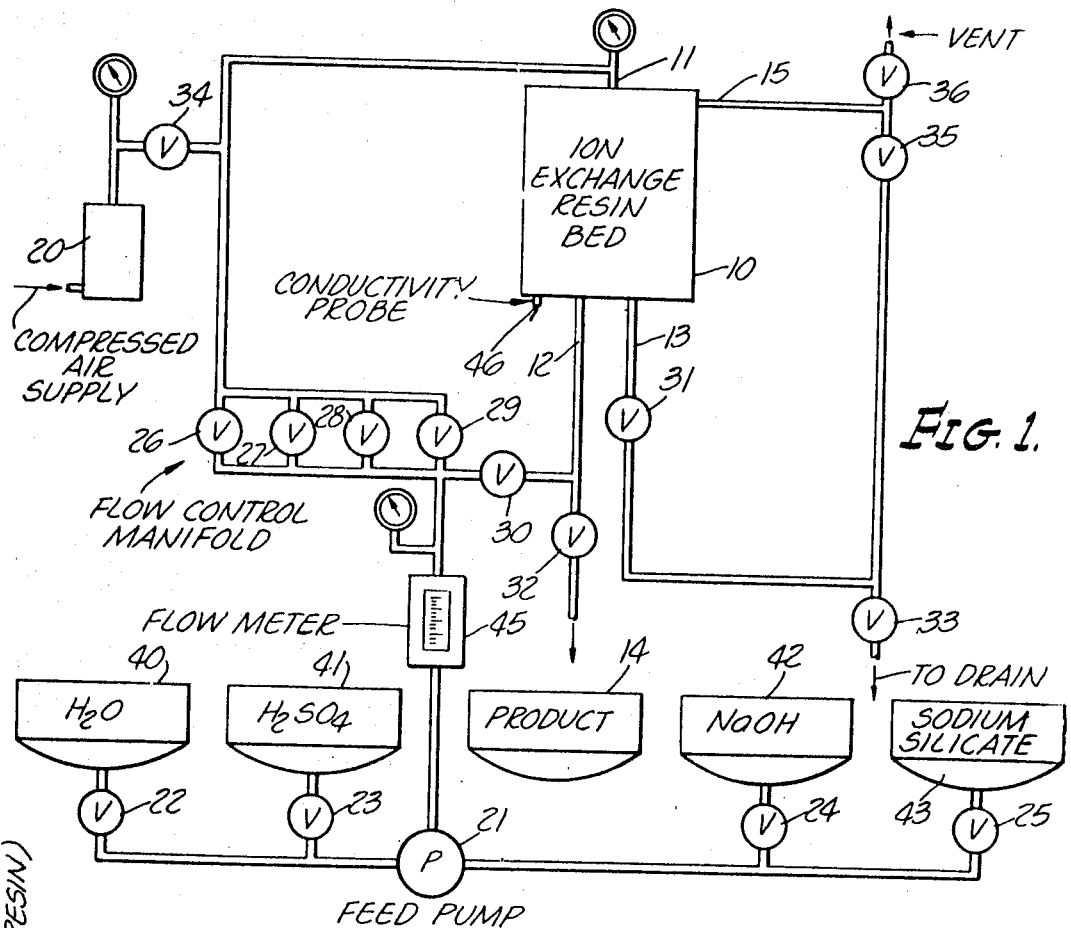

Generally speaking, and in accordance with illustrative embodiments of my invention, I provide a bed of a macroreticular cation exchange resin, which is more fully described hereinbelow, and which, in accordance with known procedures in the art, may conveniently be contained in a suitable vessel such as a vertical cylinder provided with fluid inlets top and bottom. (The apparatus features will be taken up below in detail in connection with the drawings.) Means are provided for passing liquids through the bed in either the forward or the reverse direction, which will normally correspond to vertically upwardly and vertically downwardly, although horizontal placement and flow through the bed are not excluded from the purview of the invention. Commencing the description of the cyclical process for convenience at the point where the resin bed is in a hydrogen form, I first of all flow an aqueous solution of an alkali metal silicate, such as sodium silicate, in the forward direction through the bed, the solution having a solids content expressed as $SiO_2$ of from between about 1 percent to 7 percent by weight. The flow rate is preferably quite high, compared to the usual technique of the prior art, and may be as high as 5 gallons per cubic foot of resin per minute. The effluent from the bed corresponds to the input solution with its sodium ions exchanged by hydrogen ions, the latter having been supplied by the resin. Any of several means may be employed to determine that this conversion is taking place and to estimate the degree of conversion, such as determining the pH, or, more conveniently, the electrical conductivity of the effluent.

Macroreticular cation exchange resins are commercially available and are known to those skilled in the art by that term. (The term "macroporous" is a British synonym.) Resins of this type have a structure resembling that of a sponge in which the freely interconnected pores have effective diameters of the orer of magnitude of about 0.01 micron (100 angstrom units) to about 0.20 micron (2,000 A.U.). They are generally prepared by carrying out a polymerization, or a co-polymerization as the case may be, with the monomers dissolved in a substance which is a good solvent for the monomers but a poor swelling agent for the subsequently formed polymer. Thus, styrene and di-vinylbenzene may be dissolved in such solvents as normal butanol, tertiary amyl alcohol, hexane, and the like; mixed; and co-polymerization brought about by usual methods. A macroreticular co-polymer is obtained which is freed of the solvent by evaporation, and which is subsequently sulfonated by standard procedures to yield a macroreticular cation exchange resin. Procedures for obtaining such macroreticular structure in ion exchange resins are set forth in South African patent application No. 59/2,394, and in British Patent No. 860,695, and in the series of papers by Miller et al. cited below. Additional information is found in United States Patent No. 3,278,487; in an article by Kunin et al., Journal of the American Chemical Society, 84, 305–06 (1962); by Kunin et al., IEC Product Research and Development 1 140–44 (1962); by Kun et al., Journal of Polymer Science B–2 587 (1964); by Kun, Journal of Polymer Science A–1 4 847–57 and 859–68 (1966); by Kun, Journal of Polymer Science A–3 1833 (1965). Other pertinent literature includes the series of papers by Miller et al., Journal of the Chemical Society, 1963 218 and 2779; 1964, 2740; Seidl, Soviet Plastics 12 10 (1964); Seidl et al., Chem. Listy 58 651

(1964); and, Hopff et al., Makromol. Chemie 78 24 (1964). All of these literature and patent references, together with all of the literature and patent references cited therein, are hereby included herein by reference. A widely available and highly suitable macroreticular cation exchange resin is the product obtainable in the United States known as "Amerlite IR-200."

Coming now to the drawings, FIG. 1 shows a flow diagram suited to my inventive process. Ten (10) is a vessel, conveniently cylindrical, and preferably having a ratio of net inside depth to inside diameter of about 2:1, and with a capacity of about 6 to 8 cubic feet of resin. This is provided with a primary inlet 11 at the top, an outlet 12, which discharges to a product hopper 14 and a drain outlet 13. The vessel 10 is also provided with a vent connection 15 near the top. It is filled with macroreticular cation exchange resin 16. A compressed air supply 20 is provided, as well as a feed pump 21, which, with the aid of valves 22, 23, 24, 25, 26, 27, 28, 29, 30, 31, 32, 33, 34, 35 and 36, serves to pass, variously, water, dilute sulfuric acid, dilute sodium hydroxide, and aqueous sodium silicate from supply vessels 40, 41, 42 and 43 respectively. A flow meter 45 is useful for checking the rate of flow through the system, and an electricl conductivity probe 46 in the bottom of the vessel 10 is useful for determining the termination of the exchange portion of each cycle, as well as for determining the completeness of the various washing operations.

A working example will now be given. In the test to be described, a small column arranged as previously described was loaded with 0.22 cubic feet of a macroreticular cation exchange resin ("Amberlite IR-200") which was of the sulfonated di-vinyl-benzene-styrene type previously described, having a surface area of about 42 square meters per gram, and an apparent density of about 1.01 grams per cc., and a porosity of about 32 percent, and an average pore diameter of 288 A.U. The sodium silicate used had an $SiO_2:Na_2O$ ratio of 3.75:1.0, and it, as well as the sulfuric acid and sodium hydroxide used, was of commercial grade. The process of the invention was carried out through a series of cycles corresponding to the following tabulation, which, for convenience, commences with the regeneration step:

TABLE 1

| Function | Reagent | Flow rate, gal./cu. ft./min. | Quantity, gal./cu. ft. of resin |
| --- | --- | --- | --- |
| Regeneration | 5.5% $H_2SO_4$ solution | 3.5 | 14.5 |
| Rinse | City $H_2O$ | 4.5 | 20.0 |
| Backwash | do | 7.2 | 14.0 |
| Drain | | 15.0 | |
| Service | Sodium silicate solution (6.7% $SiO_2$) | 4.9 | 7.5 |
| Drain | | 15.0 | |
| Caustic elution | 3.6% NaOH solution | 3.0 | 4.0 |
| Rinse | City $H_2O$ | 4.5 | 20.0 |
| Backwash | do | 7.2 | 15.0 |
| Drain | | 15.0 | |

The cycle in accordance with Table 1 was carried out continuously, 24 hours per day, until 2,021 cycles had been completed. The overall cycle time was subject to slight variation during the course of the run as small changes occurred in the operating conditions because of the equipment. The overall average cycle time was 25.3 minutes.

The quality of the polysilicic acid obtained remained constant throughout the test and averaged 4.0 percent $SiO_2$. Microscopic examination of the resin at the end of the test showed no physical breakdown in the resin beads. The moisture content of the resin at the end of the test, which is an indication of its cross-linkage as well as its physical structure, was the same as that of the fresh resin.

The sodium ion concentration in the product was only 40 parts per million, a very low figure in this technology.

Figure 3:
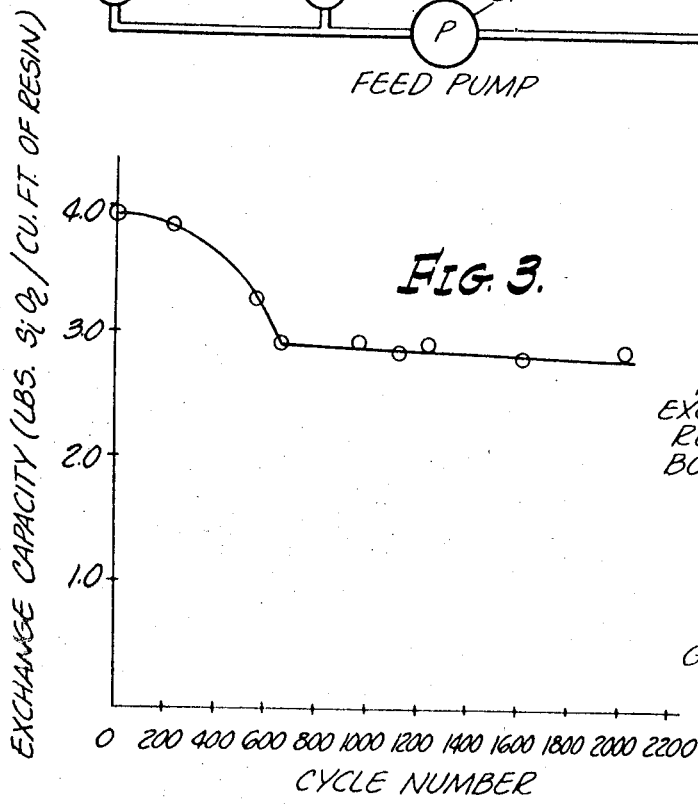
FIG. 3 is a graph showing the exchange capacity of a particular bed through more than two thousand cycles of operation in accordance with the invention.

The exchange capacity of the resin charge dropped by roughly 25 percent during the first 600 cycles, but thereafter levelled out and remained almost constant to the end of the cycling test, as shown by FIG. 3. Chemical analysis of the resin at the conclusion of the 2,021 cycles showed 0.2 percent calcium and 0.1 percent strontium which can be calculated to occupy 26 percent of the cation sites, thus substantially accounting for the total drop in cation exchange capacity of 29 percent. The source of the calcium was the city water used and a small amount as impurity in the sodium silicate; and it was removable by treatment with hydrochloric acid. It is remarkable that the only loss in operating capacity of the resin during this long series of testing was due to calcium build-up and that no trouble was encountered with gelation of the silicic material in the pores or mechanical breakdown of the resin, a result which is extraordinary in this art.

Figure 2:
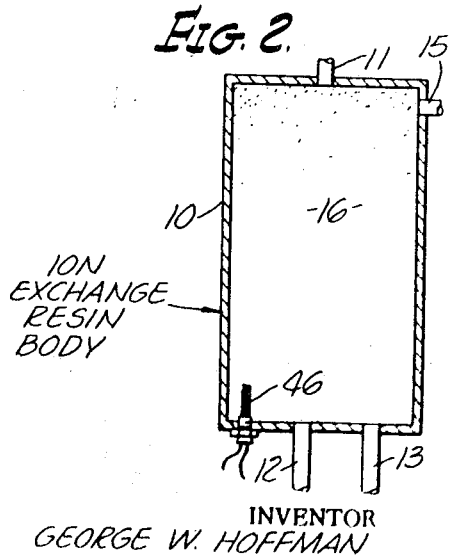
FIG. 2 is a detailed section of the ion exchange resin bed shown in FIG. 1.

In another example of my invention, the inventive process was carried out in apparatus of pilot plant size constructed essentially in accordance with the apparatus shown in FIGS. 1 and 2, and differing from the apparatus used in the previous example in size. This pilot plant apparatus had an exchange column of 12 cubic foot capacity.

In this apparatus, a charge of approximately 6 cubic feet of macroreticular cation exchange resin was used, specifically Amberlite IR-200. This was used without change for more than 2,000 cycles for the production of highly pure polysilicic acid, with no evidence of resin degradation or loss of resin, and with no problems of sodium ion "leaking" into the product. Assays of the polysilicic acid produced over the last 500 cycles of the 2,000 cycle series of runs showed a sodium ion content of from 90 to 115 parts per million, averaging about 100 parts per million, which is negligibly small. Moreover, there was no sign of gelation within the resin bed. For at least 500 of the latest cycles, each cycle corresponded to that described in detail hereinbelow for a test of ordinary, non-macroreticular cation exchange resin.

In order to show the difference in behavior between the macroreticular exchange resin described in the subject application and the same resin in ordinary, non-macroreticular form, a series of tests was carried out in which the Amberlite IR-200 was removed from the column and replaced with 6.0 cubic feet of Amberlite IR-120, this being the same resin chemically as IR-200 but is non-macroreticular form. The following conditions applied to the series of cycles used for producing polysilicic acid:

| Function | Reagent | Flow rate, gal./cu. ft./min. | Quantity, gal./cu. ft. of resin |
| --- | --- | --- | --- |
| Regeneration | 5.5% $H_2SO_4$ | 3.0 | 18 |
| Rinse | House $H_2O$ | 4.5 | 20 |
| Backwash | do | 4.5 | 20 |
| Drain | | 15.0 | |
| Service | 6.7% $SiO_2$ | 3.0 | 6.7 |
| Drain | | 15.0 | |
| Caustic elution | 4.0% NaOH | 3.0 | 5 |
| Rinse | House $H_2O$ | 4.5 | 20 |
| Backwash | do | 4.5 | 20 |
| Drain | | 15.0 | |

The sodium silicate used was Diamond Alkali grade 34 with an $SiO_2/Na_2O$ ratio of 3.75/1. The fresh capacity of the resin was determined to be 4.1 lbs. $SiO_2/ft.^3$.

A total of 13 cycles was made on the bed before gelation of silica in the bed totally blocked flow through the column.

Analysis of the polysilicic acid produced during the first 12 cycles showed an average $SiO_2$ content of 6.1%. Analysis of the dried silica showed an $Na_2O$ content of 1400 parts per million, i.e., a sodium ion content of 1050 parts per million. The sodium leakage in the IR-120 bed is enough to be detrimental to many uses of the polysilicic acid.

A problem encountered during the run was the progressive degradation of the IR-120 beads. The individual beads are split into very small particles by the osmotic shock and by the gelation of silica in the interstices. These particles are lost through the column's distribution and collection system. At the end of 13 cycles the bed had lost 0.6 ft.$^3$ of resin. This loss, of course, cut the effective capacity of the column. After over 2,000 cycles on the macroreticular IR-200, there was no sign of resin degradation and no appreciable loss of resin.

As will be seen from the examples given, it is possible to produce polysilicic acid in accordance with the inventive process not only with all of the advantages accruing with the stability of the resin, but also with exceedingly low sodium content in the finished product. Thus, in the first example, the sodium ion concentration was 40 parts per million, while in the second example it ranged from 90 to 115 parts per million. As a matter of fact, by operating the process at what might be described as relatively unfavorable conditions, such as skimping on the resin, backwashing, and the like, one might push the alkali-metal content of the product as high as 200 parts per million expressed as sodium ion, which is still a vast improvement over the procedures of the prior art.

While I have described my invention in terms of a particular example, it will be understood that a number of equivalent materials may be used, and likewise, the processing conditions are subject to considerable variation, as already explained. Thus, while the starting material is most conveniently sodium silicate, any alkali metal silicate may be used, such as potassium silicate or lithium silicate. The latter do not have any advantages over sodium silicate, however, and are more expensive. Again, the alkali metal hydroxide solution used in one step of the inventive process may be potassium hydroxide or lithium hydroxide, but again, sodium hydroxide is preferred because it is effective and relatively inexpensive. The acid which is used in a further step of the process may actually be any acid, but a strong mineral acid viz, sulfuric acid or hydrochloric acid, is preferred. Sulfuric acid is the least expensive and its only disadvantage is occasional formation of calcium sulfate, as already described, which may be readily overcome by the intermittent use of hydrochloric acid in its place.

In view of the many variations which are possible, as just mentioned, it will be understood that the invention is a broad one as defined by the claims which follow.

Having described by invention, I claim:

1. In the process of converting an aqueous solution of an alkali metal silicate to an aqueous solution of polysilicic acid wherein:

said alkali metal silicate solution, having a silica content of from about 1 percent to about 7 percent, is passed through an ion exchange bed of a cation exchange resin in acid form;

and said passage is continued until the degree of conversion of the effluent commences to drop;

and thereafter said solution is drained from said bed;

and thereafter a dilute solution of an alkali metal hydroxide is passed through said bed;

and thereafter water is passed through said bed so as to rinse said bed;

and thereafter water is passed in the reverse direction through said bed so as to backwash it;

and thereafter said water is drained from said bed;

and thereafter a dilute solution of an acid is passed through said bed so as to convert said bed to the acid form;

and thereafter water is passed through said bed so as to rinse it;

and thereafter water is passed through said bed in the reverse direction so as to backwash it;

and thereafter said water is drained from said bed;

and thereafter the aforesaid steps commencing with the passage of said silicate solution through said bed, are repeated in sequence for a selected number of total cycles;

the improvement which consists in employing said cation exchange resin in macroreticular form, whereby the alkali metal content of the effluent polysilicic acid is reduced to not more than about 200 parts per million and the steps may be repeated for thousands of cycles without substantial trouble from gelation of the silicic material in the pores or mechanical breakdown of the resin.

2. The process in accordance with claim 1 wherein said alkali metal silicate is sodium silicate.

3. The process in accordance with claim 2 wherein the $SiO_2:Na_2O$ ratio of said sodium silicate is about 3.75:1.00.

4. The process in accordance with claim 1 wherein said acid is a strong mineral acid.

5. The process in accordance with claim 1 wherein said alkali metal silicate solution is passed through said ion exchange bed at a flow rate of about five gallons of said solution per cubic foot of said resin per minute.

6. The process in accordance with claim 1 wherein said cation exchange resin is a sulfonated copolymer of styrene and di-vinylbenzene.

References Cited
UNITED STATES PATENTS

| | | | |
|---|---|---|---|
| 3,083,167 | 3/1963 | Shannon | 252—313 |
| 3,278,487 | 10/1966 | Kun | 260—47 |

RICHARD D. LOVERING, Primary Examiner

U.S. Cl. X.R.

23—182 R